(12) United States Patent
Sakuma (10) Patent No.: US 11,463,140 B2
(45) Date of Patent: *Oct. 4, 2022

(54) WIRELESS COMMUNICATION DEVICE (71) Applicant: Fujikura Ltd., Tokyo (JP)

(72) Inventor: Ken Sakuma, Sakura (JP)

(73) Assignee: FUJIKURA LTD., Tokyo (JP)

( * ) Notice: Subject to any disclaimer, the term of this patent is extended or adjusted under 35 U.S.C. 154(b) by 221 days.

This patent is subject to a terminal disclaimer.

(21) Appl. No.: 16/864,239

(22) Filed: May 1, 2020

(65) Prior Publication Data

US 2021/0344394 A1 Nov. 4, 2021

(51) Int. Cl.
*H04W 4/00* (2018.01)
*H04B 7/06* (2006.01)
*H01Q 3/26* (2006.01)
*H01Q 1/52* (2006.01)
*H04B 3/52* (2006.01)
*H04B 3/54* (2006.01)
*H04B 7/024* (2017.01)

(52) U.S. Cl.
CPC .......... *H04B 7/0617* (2013.01); *H01Q 1/523* (2013.01); *H01Q 3/2605* (2013.01); *H04B 3/52* (2013.01); *H04B 3/54* (2013.01); *H04B 7/024* (2013.01)

(58) Field of Classification Search
CPC . H04B 3/52; H04B 3/54; H04B 7/022; H04B 7/024; H04B 7/0408; H04B 7/043; H04B 7/06; H04B 7/0617; H04B 7/0639; H04B 7/0695; H04B 7/086; H04B 7/088; H04J 11/0053; H01Q 1/523; H01Q 3/24; H01Q 3/26; H01Q 3/2605; H01Q 3/36; H04W 16/28; H04W 24/02

See application file for complete search history.

(56) References Cited

U.S. PATENT DOCUMENTS

| 9,318,805 | B2 | 4/2016 | Jia | |
| 10,009,895 | B2* | 6/2018 | Nishikawa | H04B 17/318 |
| 10,218,069 | B2 | 2/2019 | Gomadam et al. | |
| 2004/0114535 | A1* | 6/2004 | Hoffmann | H04B 7/088 |
| | | | | 455/562.1 |
| 2009/0298509 | A1* | 12/2009 | Hoshino | H04B 7/0632 |
| | | | | 455/452.2 |
| 2011/0026418 | A1* | 2/2011 | Bollea | H01Q 1/2258 |
| | | | | 370/252 |

(Continued)

FOREIGN PATENT DOCUMENTS

| CA | 3041457 A1 | 1/2018 |
| CN | 105785328 B | 7/2018 |

(Continued)

OTHER PUBLICATIONS

Sur et al., WiFi-Assisted 60 GHz Wireless Networks, MobiCom'17, 14 pages, Oct. 2017.*

(Continued)

*Primary Examiner* — Frank Duong (74) *Attorney, Agent, or Firm* — WHDA, LLP (57) ABSTRACT

A wireless communication device includes a beamforming antenna and a beam former that sets a beam pattern of the beamforming antenna depending on an antenna weight vector selected from a beam table. In the beam table, a peak direction of the array factor corresponding to each antenna weight vector is non-uniformly distributed in an angular space.

7 Claims, 5 Drawing Sheets

(56) References Cited

U.S. PATENT DOCUMENTS

2016/0323755 A1* 11/2016 Cordeiro ............. H04W 72/046
2016/0359230 A1* 12/2016 Wang ........................ H01Q 3/36
2017/0142605 A1    5/2017 Cheng et al.
2017/0366242 A1* 12/2017 Lee ...................... H04B 7/0482

FOREIGN PATENT DOCUMENTS

| WO | 2013/133742 A1 | 9/2013 |
| WO | 2018/048543 A1 | 3/2018 |
| WO | 2021/254607 A1 | 12/2021 |

OTHER PUBLICATIONS

Bertrand, Thibault, Hybrid beamforming at 60GHz, Ecole polytechnique de Louvain, Université catholique de Louvain, downloadable at http://hdl.handle.net/2078.1/thesis:19404, 89 pages, 2019.*
U.S. Appl. No. 16/864,312, Ken Sakuma, filed May 1, 2020.
Non-Final Action dated Mar. 14, 2022, issued in U.S. Appl. No. 16/864,312 (11 pages).

* cited by examiner

PRIOR ART

FIG. 8

PRIOR ART

FIG. 9

PRIOR ART

FIG. 10

PRIOR ART

WIRELESS COMMUNICATION DEVICE

BACKGROUND OF THE INVENTION

Field of the Invention

The present invention relates to a wireless communication device including a beamforming antenna.

Description of the Related Art

In order to increase wireless communication capacity, a frequency band to be used has been widened and increased in frequency. For example, the millimeter-wave band (frequency band where the frequency is 30 GHz or more and 300 GHz or less) is defined as an extremely high frequency (EHF) in the International Telecommunication Union (ITU), and the development of a wireless communication device using the band is rapidly progressing. Among them, the 60 GHz band that overlaps the oxygen absorption band has a large transmission loss (as a result, the transmission distance is short), and is therefore determined as a license-free frequency band for short-range communication in many countries. For this reason, for example, in a small cell linked with a mobile communication network or a wireless access network of a wireless Internet service provider, or in a wireless backhaul link such as a wireless base station, a wireless relay station, and a public wireless LAN communication access point, the use of the 60 GHz band has been studied. In these applications, it is expected to realize a communication capacity of several Gbps between wireless communication devices separated by several tens of meters to several hundreds of meters.

In a wireless communication device using a millimeter-wave band, a beam antenna having high gain and sharp directivity is usually used. In particular, in a wireless communication device that is assumed to communicate with an opposite communication device which is a mobile terminal or to perform point to multipoint (P2MP) communication with a plurality of opposite communication devices, a beamforming antenna capable of controlling a beam pattern is used. In a wireless communication device provided with a beamforming antenna, a configuration is employed in which a beam pattern of a beamforming antenna is changed depending on a direction in which an opposite communication device is provided. A wireless communication device according to IEEE 802.1 lad is an example of a wireless communication device in which such a configuration is employed.

The beamforming antenna is constituted by a plurality of antenna elements. At the time of transmission, the transmission signal divided by the splitter is input to each antenna element after the amplitude and phase are adjusted at the amplitude adjuster and the variable phase shifter. At the time of reception, the reception signals outputted from each antenna element are combined by the power combiner after the phase and the amplitude are adjusted at the variable phase shifter and the amplitude adjuster. A wireless communication device including the beamforming antenna controls the beam pattern of the beamforming antenna by controlling the gain of the amplitude adjuster and the phase shift amount of the variable phase shifter corresponding to each antenna element.

A wireless communication device including a beamforming antenna has a beam table constituted by a plurality of antenna weight vectors. Here, the antenna weight vector refers to a vector representing the gain of the amplitude adjuster and the phase shift amount of the variable phase shifter corresponding to each antenna element. When the beamforming antenna is constituted by antenna elements of n, the antenna weight vector is given by, for example, an n-dimensional complex vector or a 2n-dimensional real vector.

A wireless communication device including a beamforming antenna sets the gain of the amplitude adjuster and the phase shift amount of the variable phase shifter by referring to the antenna weight vector selected from the beam table. If the antenna weight vector selected from the beam table is changed from the first antenna weight vector to the second antenna weight vector, the beam pattern of the beamforming antenna is changed from the first beam pattern corresponding to the first antenna weight vector to the second beam pattern corresponding to the second antenna weight vector.

The beam pattern of the beamforming antenna calculated from only the antenna weight vector is referred to an array factor. The beam pattern of the beamforming antenna is calculated by multiplying the array factor and the beam pattern of the antenna element.

U.S. Pat. No. 9,318,805 discloses a technique for updating a beam table. This technique can be applied to a wireless communication device conforming to IEEE 802.11ad.

In a conventional wireless communication device, a beam table is used in which each peak direction of an array factor corresponding to each antenna weight vector is uniformly distributed (aligned at equal intervals) in the angular space. For this reason, it is difficult to guarantee the wireless signal quality fairly for opposite communication devices locating at various directions. Hereinafter, the reason will be described with reference to a specific examples.

As one example, a beam table is considered that is constituted by thirty-one antenna weight vectors and were designed according to the following guidelines.

(1) A beamforming antenna is assumed in which sixteen antenna elements (assuming a planar patch antenna) equally spaced on a same straight line (assuming arrangement by the ½ wavelength intervals) on the same plane.

(2) As the direction orthogonal to the plane is the 90° direction, thirty-one target directions are uniformly distributed in the direction of the 30° direction to the 150° direction. That is, the angular interval in the target direction is set uniformly as $(150°-30°)/(31-1)=4°$.

(3) As the antenna weight vector corresponding to each target direction, an antenna weight vector is selected such that the gain of the array factor in the target direction is the maximum among the antenna weight vectors in which the peak direction of the array factor coincides with the target direction with a predetermined accuracy.

A list of the peak direction of the array factor of each array antenna weight vector in the beam table designed in such a manner and the angular interval between adjacent peak directions are shown below.

TABLE 1

| Beam No. | Direction [degree] | Angular interval [degree] |
|---|---|---|
| 1 | 30.0 | 4.0 |
| 2 | 34.0 | 4.0 |
| 3 | 38.0 | 4.0 |
| 4 | 42.0 | 4.0 |
| 5 | 46.0 | 4.0 |
| 6 | 50.0 | 4.0 |
| 7 | 54.0 | 4.0 |
| 8 | 58.0 | 4.0 |

TABLE 1-continued

| Beam No. | Direction [degree] | Angular interval [degree] |
|---|---|---|
| 9 | 62.0 | 4.0 |
| 10 | 66.0 | 4.0 |
| 11 | 70.0 | 4.0 |
| 12 | 74.0 | 4.0 |
| 13 | 78.0 | 4.0 |
| 14 | 82.0 | 4.0 |
| 15 | 86.0 | 4.0 |
| 16 | 90.0 | 4.0 |
| 17 | 94.0 | 4.0 |
| 18 | 98.0 | 4.0 |
| 19 | 102.0 | 4.0 |
| 20 | 106.0 | 4.0 |
| 21 | 110.0 | 4.0 |
| 22 | 114.0 | 4.0 |
| 23 | 118.0 | 4.0 |
| 24 | 122.0 | 4.0 |
| 25 | 126.0 | 4.0 |
| 26 | 130.0 | 4.0 |
| 27 | 134.0 | 4.0 |
| 28 | 138.0 | 4.0 |
| 29 | 142.0 | 4.0 |
| 30 | 146.0 | 4.0 |
| 31 | 150.0 | |

Figure 7:
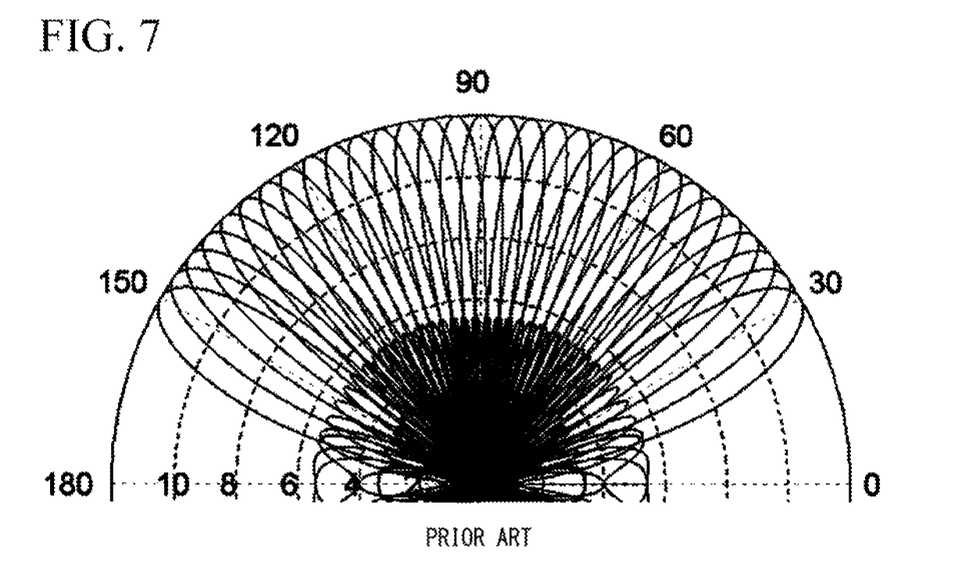
FIG. 7 is a graph (shown by the polar coordinate) showing an array factor corresponding to each antenna weight vector constituting the beam table used by the conventional wireless communication device.

FIG. 7 is a graph (shown by the polar coordinate) showing an array factor corresponding to each antenna weight vector constituting a beam table designed as described above.

Figure 8:
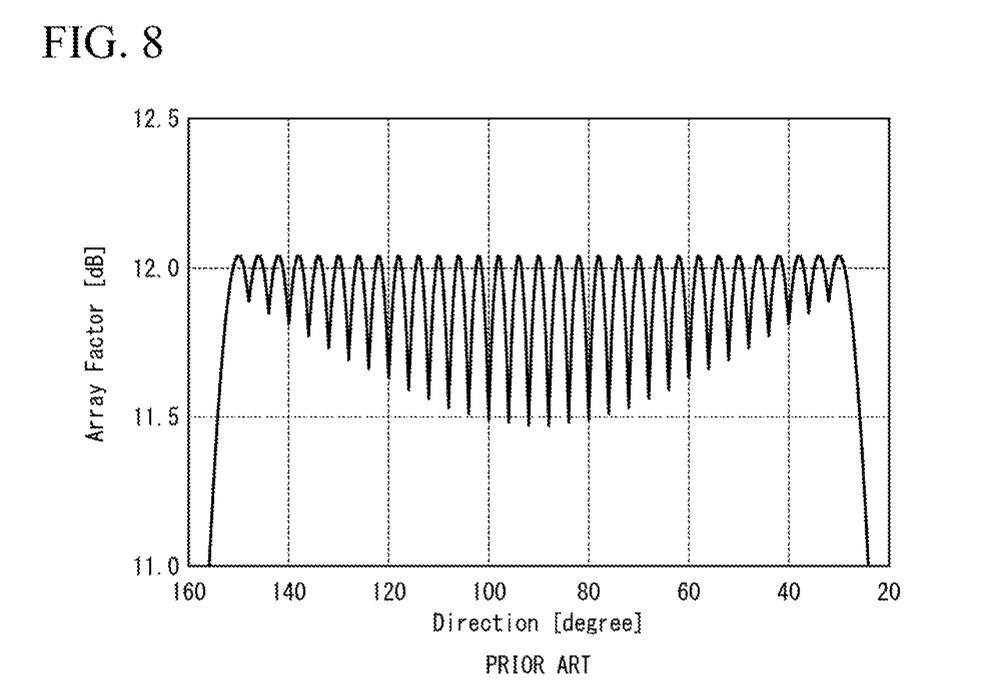
FIG. 8 is a graph (shown by the orthogonal coordinate with a vertical axis representing gain and a horizontal axis representing direction) showing an envelope of the array factor shown in FIG. 7.
Figure 9:
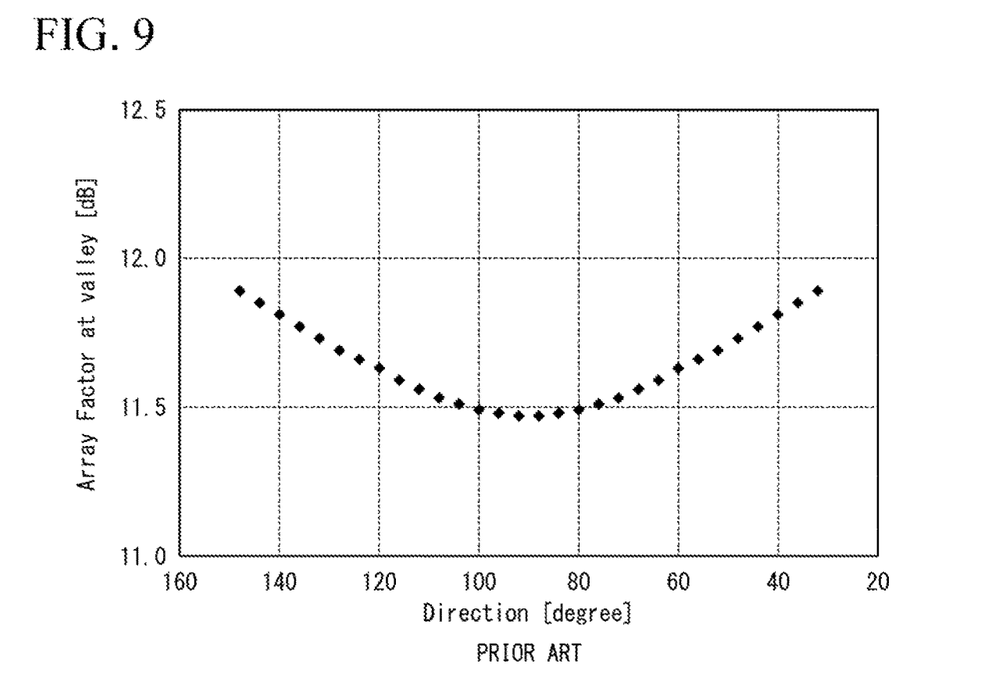
FIG. 9 is a graph (shown by the orthogonal coordinate with a vertical axis representing gain and a horizontal axis representing direction) plotting picked-up valleys of the array factor shown in FIG. 7 (minimum points of the envelope shown in FIG. 8).
Figure 10:
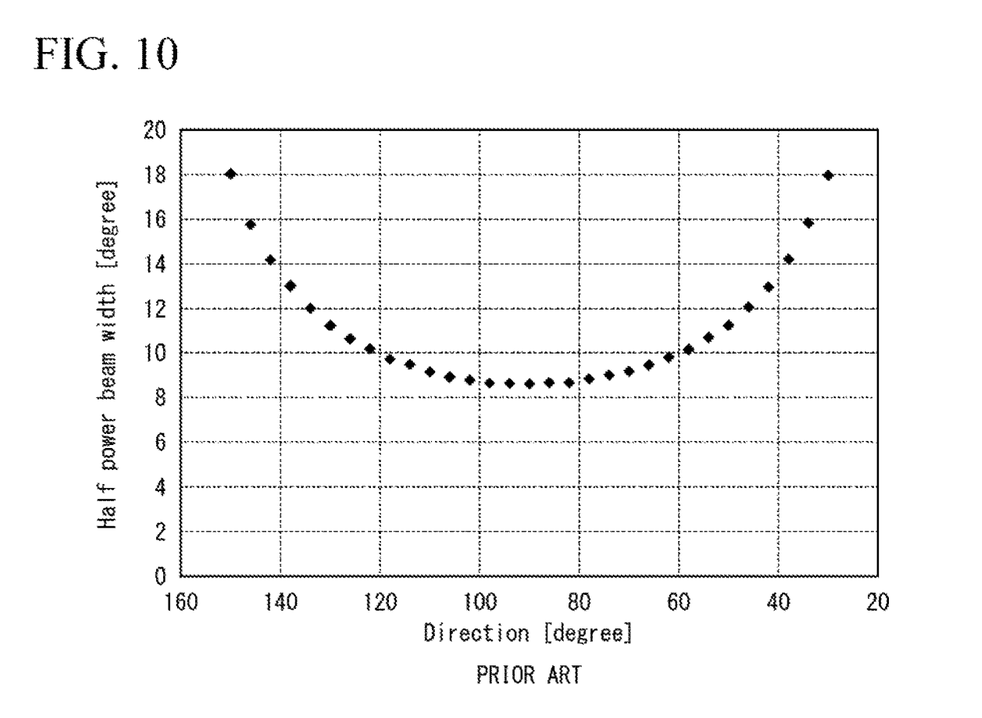
FIG. 10 is a graph (shown by the orthogonal coordinate with a vertical axis representing half power beam width and a horizontal axis representing peak direction) plotting a half power beam width of the array factor shown in FIG. 7.

FIG. 8 is a graph showing an envelope of the array factor shown in FIG. 7 (shown by the orthogonal coordinate with a vertical axis representing gain and a horizontal axis representing direction). FIG. 9 is a graph in which the valleys of the array factor shown in FIG. 7 (minimum points of the envelope shown in FIG. 8) are picked up and plotted (shown by the orthogonal coordinate with a vertical axis representing gain and a horizontal axis representing direction). FIG. 10 is a graph plotting a half power beam width of each array factor shown in FIG. 7 (shown by the orthogonal coordinate with a vertical axis representing half power beam width and a horizontal axis representing peak direction). When calculating the array factor, a frequency used is 60.48 GHz, and digitization of a variable phase shifter was 8 bits (256 levels).

According to the graph shown in FIG. 8, it can be seen that the direction exists that is the valley of the array factor, that is, the direction in which the drop of gain cannot be avoided even if the beam pattern of the beamforming antenna is set to the beam pattern corresponding to any antenna weight vector. In addition, according to the graph shown in FIG. 9, the gain in the valley of the array factor varies with the range of approximately 11.5 dB to 11.9 dB, and the fluctuation width is approximately 0.4 dB. The valley of the array factor where the gain is minimum appears in the vicinity of the 90° direction which is a direction orthogonal to a plane where antenna elements are aligned. The drop of gain in the valley (the difference from the target peak gain which is 12 dB) reaches 0.5 dB. In addition, according to the graph shown in FIG. 10, similar to the valley of the array factor where the gain is minimum, the peak direction of the array factor where the half power beam width is minimum appears in the vicinity of the 90° direction which is a direction orthogonal to a plane where antenna elements are aligned.

A large variation in the gain at the valley of the array factor means that the wireless signal quality that can be guaranteed varies greatly depending on the direction where the opposite communication device exists. In other words, unfairness occurs such that high wireless signal quality can be guaranteed for an opposite communication device existing in the vicinity of a certain direction (300 direction and 150° direction in the example described above), whereas high wireless signal quality cannot be guaranteed for an opposite communication device existing in a certain direction (the vicinity of the 90° direction in the example described above).

When the opposite communication device is a mobile terminal, even if the above-mentioned unfairness occurs, the opposite communication device is unlikely to suffer a serious disadvantage. This is because there is a low possibility that the opposite communication device will continue to exist in a direction where a significant drop of gain cannot be avoided. On the other hand, when the opposite communication device is a fixed terminal, if the above-mentioned unfairness occurs, there is a high possibility that the opposite communication device suffers a serious disadvantage. This is because there is a high possibility that an opposite communication device once installed in a direction in which a significant drop of gain is unavoidable will continue to exist in that direction. Incidentally, as the disadvantage for the opposite communication device, for example, the decrease of the communication speed along with the decrease in wireless signal quality which may occur in a wireless communication device that switches a modulation and coding scheme (MCS) depending on the wireless signal quality.

SUMMARY OF THE INVENTION

An aspect of the present invention has been made in view of the above-described circumstances and to realize a wireless communication device capable of more fairly assuring wireless signal quality with respect to an opposite communication devices existing in various directions.

A wireless communication device according to an aspect of the present invention includes a beamforming antenna and a beam former that sets a beam pattern of the beamforming antenna depending on an antenna weight vector selected from a beam table, where in the beam table, a peak direction of an array factor corresponding to each antenna weight vector is non-uniformly distributed in an angular space.

According to one aspect of the present invention, by using a beam table in which the peak direction of the array factor corresponding to each antenna weight vector is non-uniformly distributed in an angular space, it is possible to realize a wireless communication device capable of more fairly assuring wireless signal quality with respect to an opposite communication devices existing in various directions.

DETAILED DESCRIPTION OF THE PREFERRED EMBODIMENTS (Wireless Communication System)

Figure 1:
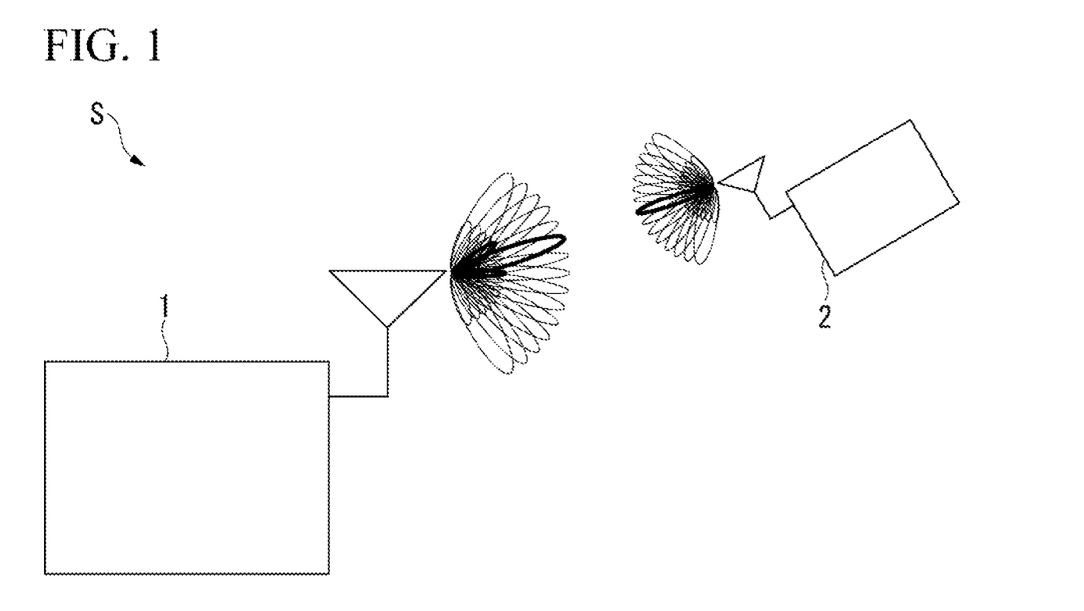
FIG. 1 is a diagram showing a configuration of a wireless communication system according to one embodiment of the present invention.

The configuration of the wireless communication system S according to the present embodiment will be described with reference to FIG. 1. FIG. 1 is a diagram showing a configuration of the wireless communication system S.

As shown in FIG. 1, the wireless communication system S includes a first wireless communication device 1 (an example of "wireless communication device" in the claims) and a second wireless communication device 2 (an example of "opposite communication device" in the claims).

The first wireless communication device 1 is a wireless communication device connected to the upstream network. As an example, the first wireless communication device 1 is a wireless communication device managed by a wireless Internet service provider. In this case, the first wireless communication device 1 is connected to the Internet (an example of an upstream network) via a provider network, for example. An optical fiber line or a wireless communication line is used for connection between the first wireless communication device 1 and the provider network, for example.

The second wireless communication device 2 is a wireless communication device connected to the downstream network. As an example, the second wireless communication device 2 is a wireless communication device managed by a user who has a contract with a service provider. In this case, the second wireless communication device 2 is connected to, for example, a local area network (an example of a downstream network) in the user's home.

In addition, in FIG. 1, although the configuration which has one second wireless communication device 2 is shown, it is not limited to this. For example, a configuration in which there are two or more second wireless communication devices 2 may be employed. In this case, each of the two or more second wireless communication devices 2 performs wireless communication with one first wireless communication device 1.

Each of the first wireless communication device 1 and the second wireless communication device 2 includes a beamforming antenna. The first wireless communication device 1 specifies the direction in which the second wireless communication device 2 is located in the beamforming process, and also selects a beam pattern corresponding to the specified direction as the beam pattern of the beamforming antenna included in the first wireless communication device 1. Similarly, the second wireless communication device 2 specifies the direction in which the first wireless communication device 1 exists in the process of performing beamforming, and also selects a beam pattern corresponding to the specified direction as the beam pattern of the beamforming antenna included in the second wireless communication device 2. Thereafter, the first wireless communication device 1 and the second wireless communication device 2 each perform the wireless communication according to a modulation and coding scheme (MCS) corresponding to the wireless signal quality. For example, a high-speed wireless communication is performed when the wireless signal quality is good, and a low-speed wireless communication is performed when the wireless signal quality is poor.

The wireless communication system S according to the present embodiment is characterized by a beam pattern that can be selected by the first wireless communication device 1 as a beam pattern of a beamforming antenna used for the wireless communication with the second wireless communication device 2. The beam pattern that can be selected by the first wireless communication device 1 as the beam pattern of the beamforming antenna used for wireless communication with the second wireless communication device 2 will be described later with reference to different drawings.

The first wireless communication device 1 is not limited to a wireless communication device installed by a service provider. Similarly, the second wireless communication device 2 is not limited to a wireless communication device installed by a user who has a contract with a service provider. For example, the first wireless communication device 1 and the second wireless communication device 2 may be wireless communication devices installed by organizations such as companies and public institutions.

(Configuration of First Wireless Communication Device)

Figure 2:
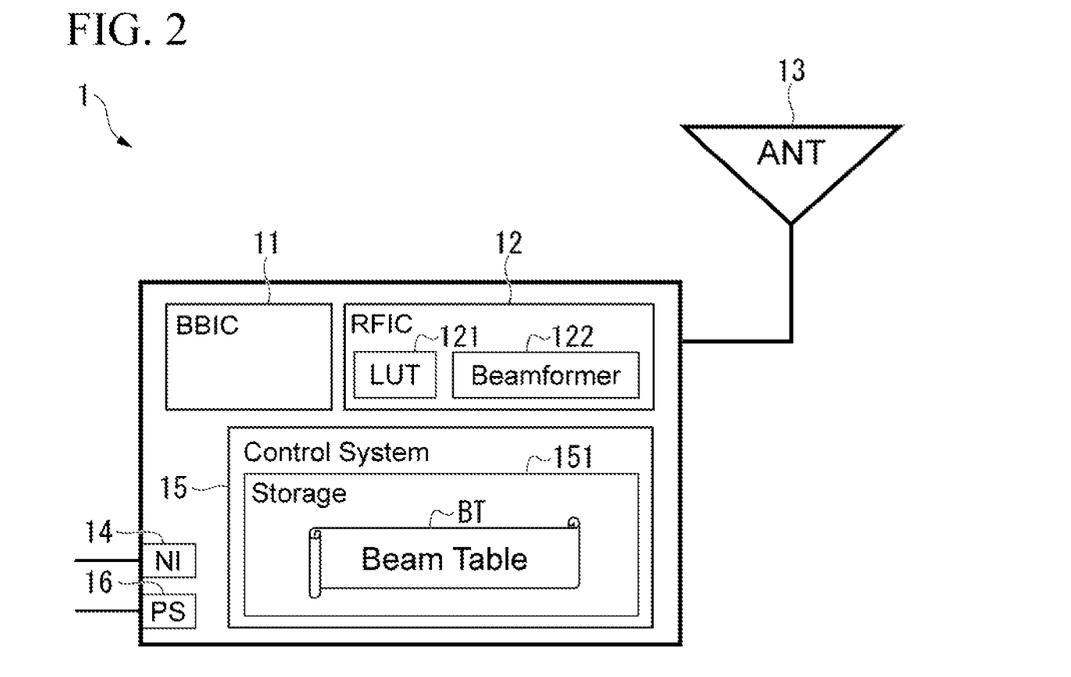
FIG. 2 is a block diagram showing a configuration of a first wireless communication device provided in the wireless communication system shown in FIG. 1.

A configuration of the first wireless communication device 1 included in the wireless communication system S will be described with reference to FIG. 2. FIG. 2 is a block diagram showing a configuration of the first wireless communication device 1.

As shown in FIG. 2, the first wireless communication device 1 includes a baseband integrated circuit (BBIC) 11, a radio frequency integrated circuit (RFIC) 12, a beamforming antenna 13, a network interface 14, a control system 15, and a power supply unit 16.

The BBIC 11 is an integrated circuit that processes a baseband (BB) signal. The RFIC 12 is an integrated circuit that processes a radio frequency (RF) signal. The beamforming antenna 13 is an antenna capable of setting a beam pattern depending on an antenna weight vector, and is used for wireless communication with the second wireless communication device 2. In the present embodiment, a phased array antenna constituted by a plurality of antenna elements is used as the beamforming antenna 13. The network interface 14 is an interface for connecting the wireless communication device 1 to the upstream network. The control system 15 mediates the communication between the upstream network connected to the first wireless communication device 1 and the downstream network connected to the second wireless communication device 2 by controlling the BBIC 11 and the RFIC 12. The control system 15 executes control of the BBIC 11 and the RFIC 12 by referring to various databases according to a provided program. The power supply unit 16 supplies power obtained from the outside to each unit of the first wireless communication device 1.

The RFIC 12 includes a look-up table (LUT) 121 and a beam former 122. An antenna weight vector transferred from the storage 151 described later is stored in the LUT 121. The beam former 122 sets the beam pattern of the beamforming antenna 13 according to the antenna weight vector stored in the LUT 121. The beam former 122 is constituted by, for example, an amplitude adjuster in which a gain is set according to an antenna weight vector and a variable phase shifter device in which a phase shift amount is set.

The control system 15 includes a storage 151. The storage 151 stores a plurality of antenna weight vectors. As the storage 151, for example, a storage medium such as a hard disk drive (HDD), a solid state drive (SSD), or a flash memory can be used. In addition, a non-volatile storage area built in an application specific integrated circuit (ASIC) or a system-on-a-chip (SoC) functioning as the control system 15 may be used as the storage 151. The control system 15 selects one antenna weight vector from a plurality of antenna weight vectors stored in the storage 151, and transfers the selected antenna weight vector to the LUT 121 described above.

In the following description, the beam pattern corresponding to a certain antenna weight vector refers to a beam pattern of the beamforming antenna 13 obtained when the gain of the amplitude adjuster constituting the beam former 122 and the phase shift amount of the variable phase shifter are set depending on the antenna weight vector. An array factor corresponding to an antenna weight vector refers to a beam pattern corresponding to the antenna weight vector when each antenna element being non-directional. A beam pattern corresponding to an antenna weight vector is calculated by multiplying the array factor corresponding to the antenna weight vector and the beam pattern of each antenna element.

(Beam Table Stored in Storage)

The storage 151 included in the first wireless communication device 1 stores a beam table BT constituted by a plurality of antenna weight vectors. The peak direction of the array factor corresponding to each antenna weight vector constituting the beam table BT is non-uniformly distributed in the angular space (not arranged at equal intervals). As an example, regarding the peak direction of the array factor corresponding to each antenna weight vector constituting the beam table BT, the difference between two peak directions adjacent to each other in the angular space varies depending on the angle difference from the direction orthogonal to the plane in which the antenna elements constituting the beamforming antenna 13 are arranged.

In the wireless communication device 1 according to the present embodiment, the peak direction of the array factor corresponding to each antenna weight vector constituting the beam table BT is the densest in the direction orthogonal to the plane in which the antenna elements constituting the beamforming antenna 13 are arranged, and furthermore, is distributed so that the peak direction becomes gradually sparser as being away from the direction. In other words, the peak distribution is the densest in the direction where each half power beam width of the array factor corresponding to each antenna weight vector constituting the beam table BT is the narrowest and becomes gradually sparser as being away from the direction. The peak direction in a certain direction being the densest is equivalent to the difference between two peak directions adjacent to each other in the angular space being minimum in the direction. The peak direction becoming gradually sparser in the angular space is equivalent to gradually increasing the difference between two peak directions adjacent to each other in the angular space.

The first wireless communication device 1 uses such a beam table BT when the direction in which the second wireless communication device 2 exists is not specified. For example, the wireless communication device 1 compatible with IEEE 802.11 ad uses such a standard beam table SBT in a sector-level sweep (SLS) phase or a beam refinement protocol (BRP) phase performed in a state where the direction in which the second wireless communication device 2 exists is not specified. At this time, the control system 15 transfers the antenna weight vector constituting the beam table BT stored in the storage 151 to the LUT 121 of the RFIC 12. The beam former 122 of the RFIC 12 sets the beam pattern of the beamforming antenna 13 depending on the antenna weight vector transferred to the LUT 121 of the RFIC 12.

As an example, a beam table BT constituted by thirty-one antenna weight vectors and designed according to the following guidelines is considered.

(1) Assuming a beamforming antenna 13 constituted by sixteen antenna elements (assuming a planar patch antenna) that are equally spaced on the same line (assuming ½ wavelength spacing) in the same plane. As the direction orthogonal to the plane is 90° direction, the direction from the 30° direction to the 150° direction is covered. At this time, the thirty-one target directions are non-uniformly distributed so that the gain in the valley of the array factor corresponding to each antenna weight vector is constant. To explain the details, when thirty-one target directions are uniformly distributed, the angular interval in the target direction is uniformly set as (150°−30°)/(31−1)=4° in design results. Compared to this uniformly distributed design case, the angular interval in the target direction for a direction with a large gain in the valley of the array factor is widely adjusted, and the target direction for a direction with a small gain in the valley of the array factor is narrowly adjusted to be distributed in the target direction.

(2) As the antenna weight vector corresponding to each target direction, an antenna weight vector is selected such that the gain of the array factor in the target direction is the maximum among the antenna weight vectors in which the peak direction of the array factor coincides with the target direction with a predetermined accuracy.

(3) The designed results are investigated, and readjusted and redesigned the distribution in the target direction until the difference in gain in the valley of the array factor corresponding to each antenna weight vector becomes sufficiently small. A list of the array factor peak directions of each array antenna weight vector designed in this manner and the angular intervals between adjacent peak directions are shown in Table 2.

TABLE 2

| Beam No. | Direction [degree] | Angular interval [degree] |
|---|---|---|
| 1 | 30.0 | 6.0 |
| 2 | 36.0 | 5.3 |

TABLE 2-continued

| Beam No. | Direction [degree] | Angular interval [degree] |
|---|---|---|
| 3 | 41.3 | 4.8 |
| 4 | 46.1 | 4.4 |
| 5 | 50.5 | 4.2 |
| 6 | 54.7 | 4.0 |
| 7 | 58.7 | 3.8 |
| 8 | 62.5 | 3.7 |
| 9 | 66.2 | 3.6 |
| 10 | 69.8 | 3.5 |
| 11 | 73.3 | 3.4 |
| 12 | 76.7 | 3.4 |
| 13 | 80.1 | 3.3 |
| 14 | 83.4 | 3.3 |
| 15 | 86.7 | 3.3 |
| 16 | 90.0 | 3.3 |
| 17 | 93.3 | 3.3 |
| 18 | 96.6 | 3.3 |
| 19 | 99.9 | 3.4 |
| 20 | 103.3 | 3.4 |
| 21 | 106.7 | 3.5 |
| 22 | 110.2 | 3.6 |
| 23 | 113.8 | 3.7 |
| 24 | 117.5 | 3.8 |
| 25 | 121.3 | 4.0 |
| 26 | 125.3 | 4.2 |
| 27 | 129.5 | 4.4 |
| 28 | 133.9 | 4.8 |
| 29 | 138.7 | 5.3 |
| 30 | 144.0 | 6.0 |
| 31 | 150.0 | |

Figure 3:
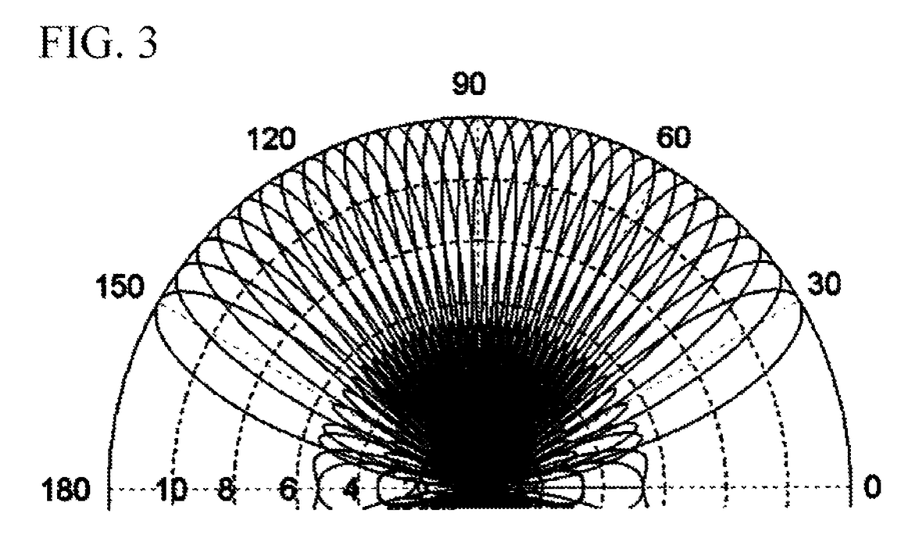
FIG. 3 is a graph (shown by the polar coordinate) showing an array factor corresponding to each antenna weight vector constituting the beam table used by the first wireless communication device shown in FIG. 2.
Figure 4:
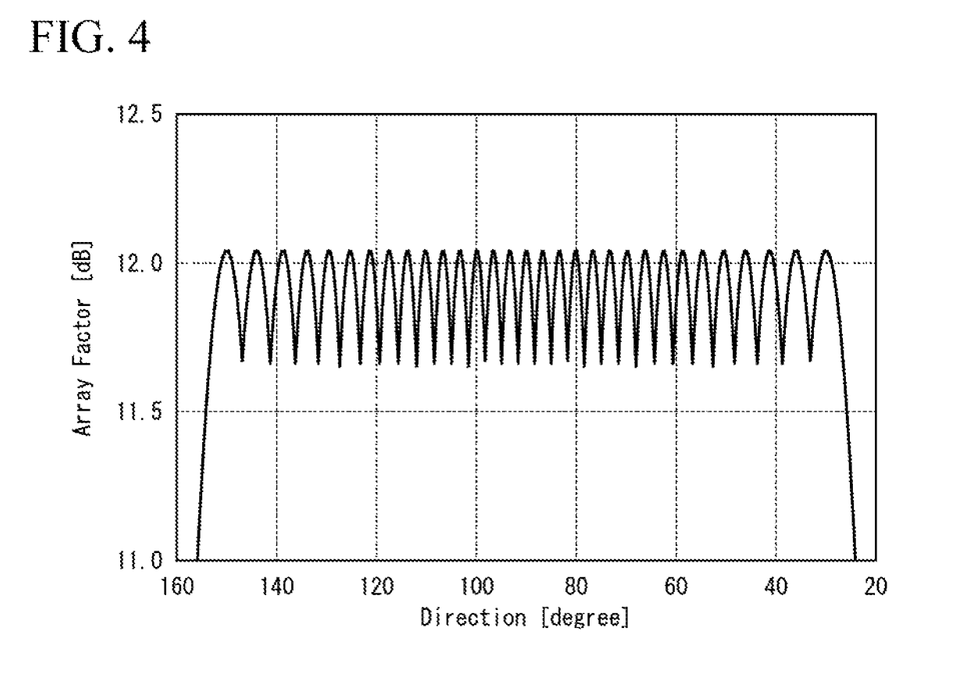
FIG. 4 is a graph (shown by the orthogonal coordinate with a vertical axis representing gain and a horizontal axis representing direction) showing an envelope of the array factor shown in FIG. 3.
Figure 5:
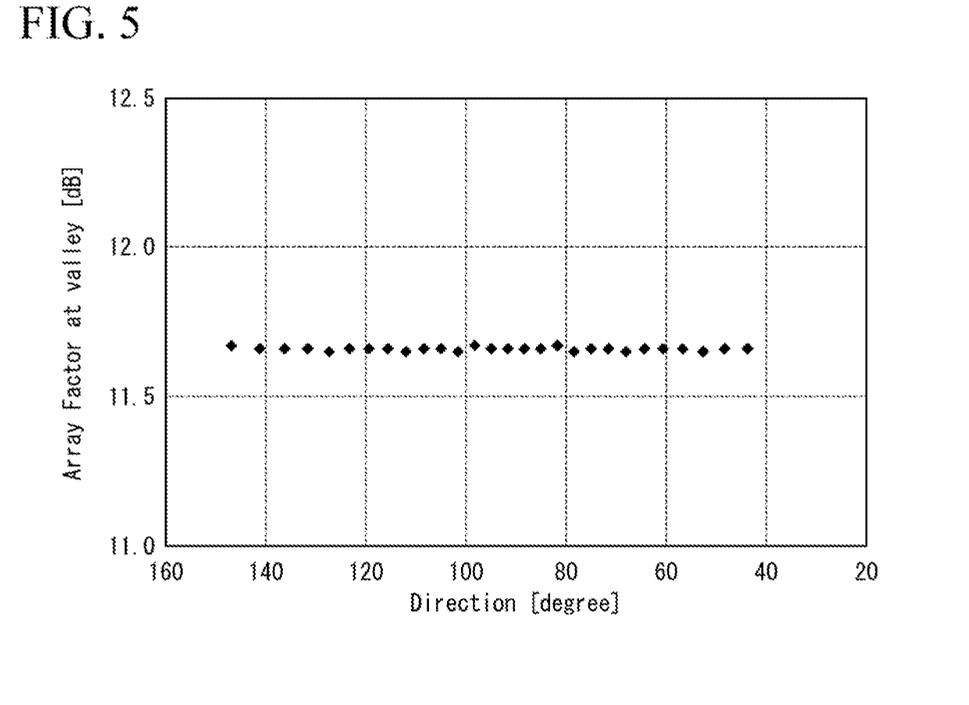
FIG. 5 is a graph (shown by the orthogonal coordinate with a vertical axis representing gain and a horizontal axis representing direction) plotting picked-up valleys of the array factor shown in FIG. 3 (minimum points of the envelope shown in FIG. 4).
Figure 6:
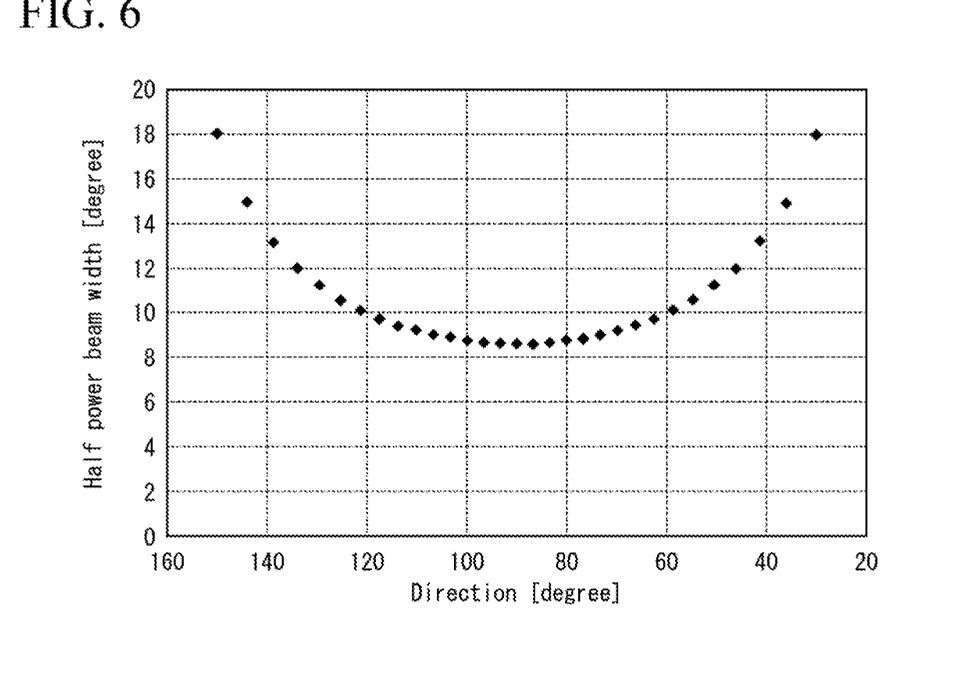
FIG. 6 is a graph (shown by the orthogonal coordinate with a vertical axis representing half power beam width and a horizontal axis representing peak direction) plotting a half power beam width of the array factor shown in FIG. 3.

FIG. 3 is a graph (shown by the polar coordinate) showing an array factor corresponding to each antenna weight vector constituting the beam table BT designed as described above. FIG. 4 is a graph (shown by the orthogonal coordinate with a vertical axis representing gain and a horizontal axis representing direction) showing an envelope of the array factor shown in FIG. 3. FIG. 5 is a graph (shown by the orthogonal coordinate with a vertical axis representing gain and a horizontal axis representing direction) plotting picked-up valleys of the array factor shown in FIG. 3 (minimum points of the envelope shown in FIG. 4). FIG. 6 is a graph (shown by the orthogonal coordinate with a vertical axis representing half power beam width and a horizontal axis representing peak direction) plotting a half power beam width of the array factor shown in FIG. 3. When calculating the array factor, the frequency used was 60.48 GHz, and the digitization of the variable phase shifter was 8 bits (256 levels).

As shown in Table 2, the peak direction of the array factor corresponding to each antenna weight vector constituting the beam table BT is the densest in the 90° direction, which is the direction orthogonal to the plane in which the antenna elements constituting the beamforming antenna 13 are arranged, and furthermore, is distributed so that the peak direction becomes gradually sparser as being away from the direction. The angular interval of the peak direction in the vicinity of the 90° direction where the peak directions are distributed most densely is 3.3°, and the angular interval of the peak direction in the vicinity of the 30° direction and the 150° direction where the peak directions are distributed most sparsely is 6.0°.

When the graph shown in FIG. 5 is compared with the graph shown in FIG. 9, the following can be found. That is, when the conventional beam table is used, the gain at the valley of the array factor varies in a range from approximately 11.5 dB to 11.9 dB, and the variation range is approximately 0.4 dB. On the other hand, when the beam table BT of the present embodiment is used, the gain at the valley of the array factor varies in the range from 11.65 dB to 11.67 dB, and the variation range is 0.02 dB. That is, by using the beam table BT of the present embodiment, the variation range of the gain at the valley of the array factor can be reduced. Actually, when the beam table BT of the present embodiment is used, the variation range of the gain at the valley of the array factor is negligibly small compared to the gain of the valley of the array factor, and the gain in the valley of the array factor is substantially constant.

Therefore, according to the first wireless communication device 1 according to the present embodiment, it is possible to more fairly guarantee the wireless signal quality with respect to the second wireless communication device 2 existing in various directions.

Assuming that the antenna elements constituting the beamforming antenna 13 are arranged along the x-axis of the orthogonal coordinate system in the xy plane, the 0° direction is the x-axis positive direction, the 90° direction is the z-axis positive direction, the 180° direction is the x-axis negative direction, and the 270° direction is the z-axis negative direction. In this case, the array factor is plane-symmetric with respect to the xy plane. For this reason, in the graph mentioned above, the plot from the 180° direction to the 360° direction is omitted.

In the present embodiment, the configuration in which the beam table BT is stored in the storage 151 has been described, but the present invention is not limited to this. The beam table 151 may be stored in a nonvolatile storage area built in an application specific integrated circuit (ASIC) or a system-on-a-chip (SoC) that functions as the control system 15.

The wireless communication device according to the first aspect of the present invention includes a beamforming antenna, and a beam former that sets a beam pattern of the beamforming antenna depending on an antenna weight vector selected from a beam table. In the beam table, a peak direction of an array factor corresponding to each antenna weight vector is non-uniformly distributed in an angular space.

In the wireless communication device according to the second aspect of the present invention, in addition to the configuration of the wireless communication device according to the first aspect of the present invention, a configuration may be employed such that in the peak direction of the array factor corresponding to each antenna weight vector constituting the beam table, a difference between two peak directions adjacent to each other in the angular space varies depending on a difference from a direction orthogonal to a plane in which antenna elements constituting the beamforming antenna are arranged.

In the wireless communication device according to the third aspect of the present invention, in addition to the configuration of the wireless communication device according to the second aspect of the present invention, a configuration may be employed such that in a peak direction of an array factor corresponding to each antenna weight vector constituting the beam table, a difference between two peak directions adjacent to each other in the angular space is minimized in a vicinity of a direction orthogonal to the plane.

In the wireless communication device according to the fourth aspect of the present invention, in addition to the configuration of the wireless communication device according to the third aspect of the present invention, a configuration may be employed such that in the peak direction of the array factor corresponding to each antenna weight vector constituting the beam table, a difference between two peak directions adjacent to each other in the angular space gradually increases as being away from a direction orthogonal to the plane.

In the wireless communication device according to the fifth aspect of the present invention, in addition to the configuration of the wireless communication device according to the first aspect of the present invention, a configuration may be employed such that a distribution of a peak direction of the array factor corresponding to each antenna weight vector constituting the beam table is the densest in a vicinity of a direction where a half power beam width of the array factor is minimum.

In the wireless communication device according to the sixth aspect of the present invention, in addition to the configuration of the wireless communication device according to the first aspect of the present invention, a configuration may be employed such that a distribution of a peak direction of the array factor corresponding to each antenna weight vector constituting the beam table is set such that a gain in a valley of the array factor is constant.

The present invention is not limited to the above-described embodiments, and various modifications can be made within the scope shown in the claims, and embodiments obtained by appropriately combining technical means disclosed in different embodiments are also included in the technical scope of the present invention.

What is claimed is:

1. A wireless communication device comprising:
   a beamforming antenna; and
   a beam former that sets a beam pattern of the beamforming antenna depending on an antenna weight vector selected from a beam table,
   wherein in the beam table, a peak direction of an array factor corresponding to each antenna weight vector is non-uniformly distributed in an angular space such that a difference between two peak directions adjacent to each other in the angular space varies in the peak direction of the array factor corresponding to each antenna weight vector constituting the beam table.

2. The wireless communication device according to claim 1, wherein in the peak direction of the array factor corresponding to each antenna weight vector constituting the beam table, the difference between two peak directions adjacent to each other in the angular space varies depending on a difference from a direction orthogonal to a plane in which antenna elements constituting the beamforming antenna are arranged.

3. The wireless communication device according to claim 2, wherein in the peak direction of the array factor corresponding to each antenna weight vector constituting the beam table, the difference between two peak directions adjacent to each other in the angular space is minimized in a vicinity of a direction orthogonal to the plane.

4. The wireless communication device according to claim 3, wherein in the peak direction of the array factor corresponding to each antenna weight vector constituting the beam table, the difference between two peak directions adjacent to each other in the angular space gradually increases as being away from a direction orthogonal to the plane.

5. The wireless communication device according to claim 1, wherein a distribution of a peak direction of the array factor corresponding to each antenna weight vector constituting the beam table is the densest in a vicinity of a direction where a half power beam width of the array factor is minimum.

6. The wireless communication device according to claim 1, wherein a distribution of a peak direction of the array factor corresponding to each antenna weight vector constituting the beam table is set such that a gain in a valley of the array factor is constant.

7. The wireless communication device according to claim 1, wherein a distribution of a peak direction of the array factor corresponding to each antenna weight vector constituting the beam table is set such that a gain in a valley of the array factor is substantially constant.

* * * * *